Nov. 1, 1927.
J. T. SOMNIS
SNOWPLOW
Filed Feb. 26, 1927
1,647,550
2 Sheets-Sheet 2
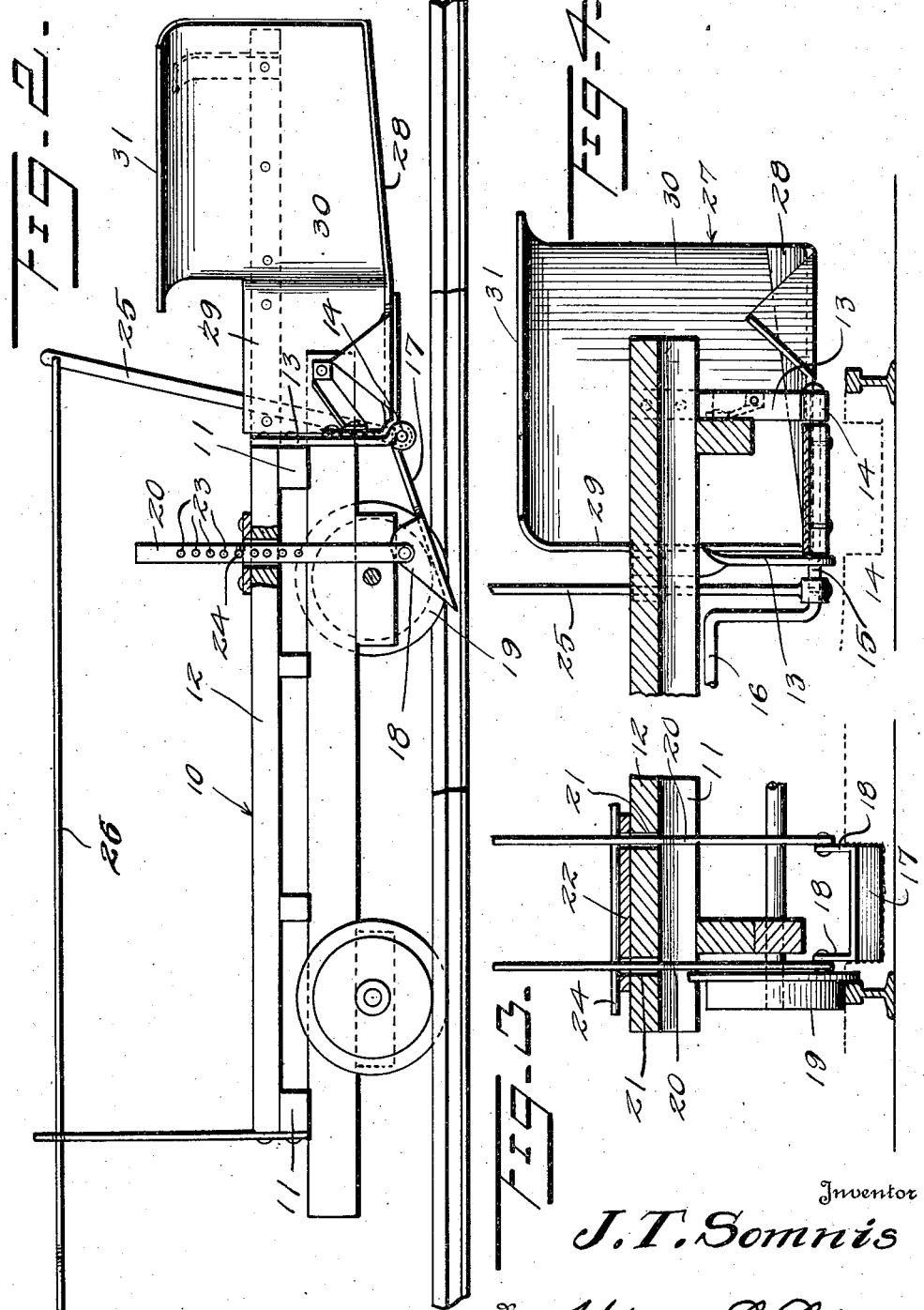

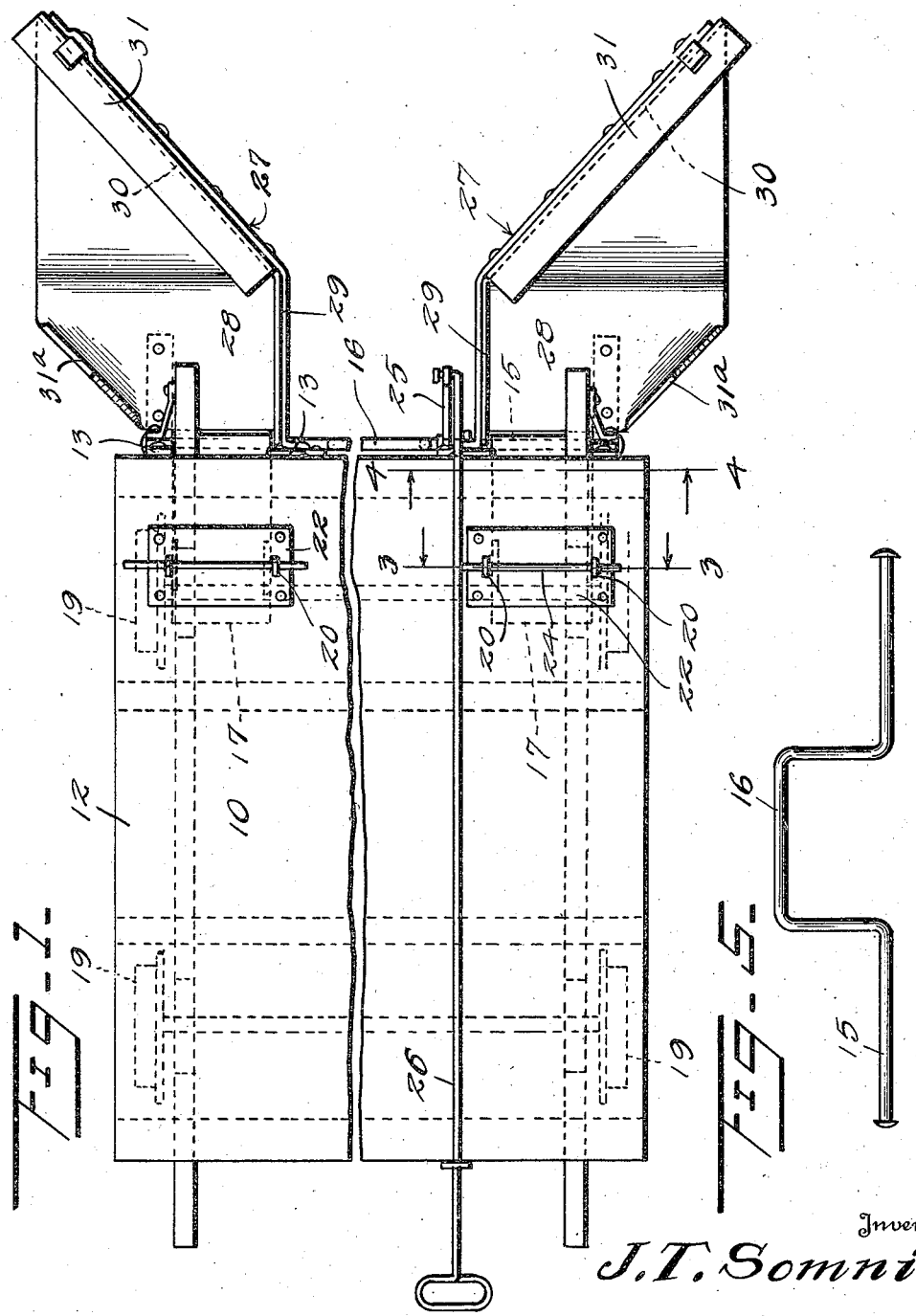

Patented Nov. 1, 1927.

1,647,550

UNITED STATES PATENT OFFICE.

JOHN T. SOMNIS, OF CONGER, MINNESOTA.

SNOWPLOW.

Application filed February 26, 1927. Serial No. 171,264.

This invention relates to snow plows and more particularly to the construction of a small snow plow for removing snow from adjacent the rails of a railway.

An important object of the invention is to produce a device of this character, particularly adapted for use in cleaning the track of light snows and which may be propelled by and controlled from the ordinary motor car used by trackmen in railway work.

A further object of the invention is to provide a device of this character which may be attached to the ordinary push car or trailer used for transporting tools for use in track work.

These and other objects I attain by the construction shown in the accompanying drawings, wherein for the purpose of illustration is shown a preferred embodiment of my invention and wherein:—

Figure 1 is a plan view of a push car embodying snow plow attachments constructed in accordance with my invention;

Figure 2 is a side elevation thereof, partially broken away;

Figure 3 is a section on the line 3—3 of Figure 1;

Figure 4 is a section on the line 4—4 of Figure 1;

Figure 5 is a detail of the shaft employed.

Referring now more particularly to the drawings, the numeral 10 generally designates a small flat car of the type, generally termed a push car or trailer. The platforms of these cars are secured to the running gear thereof by a framework including transversely extending bars 11, one of which is generally disposed at the rear end of the platform 12.

In accordance with my invention, I secure to the rear end of the platform and this beam a plurality of hangers 13 which are arranged in pairs located at opposite sides of the platform. Mounted for rocking movement in bearings 14 formed by the lower ends of the hangers is a shaft 15, the center of which is preferably offset, as at 16, for a purpose presently to appear.

To the shaft intermediate each pair of hangers is secured the rear end of a blade 17, the sides of which, adjacent the forward end thereof, have flanges 18 combining with the blade to produce a scoop. The outer flange 18 of each scoop operates immediately adjacent the inner face of the wheel 19 at the corresponding side of the car 10. To the flanges 18 are pivoted the lower ends of links 20, the upper ends of which project through openings 21 formed in the car floor 12 and plates 22 applied to the upper surface thereof. These links have coacting series of vertically spaced openings 23 through which a bar 24 may be passed, so that this bar, by its engagement with the plate 22, may limit downward movement of the links and accordingly of the blade. To the shaft 15 is secured an arm 25, the upper end of which has connected thereto an operating bar 26 which may be either directed forwardly over the car 10 to a traction device, by means of which the car is drawn, or rearwardly to a pusher, by means of which the car is operated. This bar serves as a means for elevating the forward or scoop ends of the blades 17 to permit passage thereof over cattle guards, crossings or the like.

Associated with each blade 17 is a deflector, generally designated at 27. This deflector has a bottom wall 28, the forward edge of which aligns with and extends in close proximity to the rear or pivoted edge of the associated blade 17 and is provided along its inner edge with a side wall 29. The rear edge of the bottom 28, which is at an angle to the longitudinal axis of the car 10, likewise has a wall 30, the upper edge of which is arcuately curved and overhangs the bottom wall 28, as indicated at 31. The forward edge of the bottom 28 from a point a little outward of the associated blade 17 is beveled rearwardly, so that it substantially parallels the rear edge of the blade and is likewise provided with a wall, as indicated at 31ª. The outer edge of the bottom has no wall and constitutes the discharge edge of the deflector. This discharge edge is arranged outwardly of the rails over which the wheels of the truck are passing.

In the use of the device, the snow gathered up by the scoop of each blade passes rearwardly over the blade and upon the bottom of the associated deflector. Urged by the snow following the device, the snow is crowded from the deflector and when a device of this character is operated at a speed of fifteen to eighteen miles an hour, will be thrown to the outside of the track rails a distance of five to ten feet. It will be noted that the blades only remove a trough adjacent each rail, thus insuring against packing of the snow at the rail which would probably result in derailment of cars passing thereover. The offsetting of the shaft 15 at 16 enables the shaft to clear snow left at the center of the tracks. While the device hereinbefore illustrated is provided with two of the plow elements, it will be obvious that a single plow element can be employed, if so desired.

Since the construction is otherwise capable of a certain range of change and modification without materially departing from the spirit of the invention, I do not limit myself to such specific structure except as hereinafter claimed.

I claim:—

1. In combination with a wheeled platform the wheels of which are adapted for engagement with the rails of a railroad right-of-way, bearings secured to and supported from said platform, a shaft oscillatable in said bearings, means for oscillating the shaft, a blade carried by the shaft and having its outer edge extending adjacent the inner face of a rail over which the platform is passing, means for limiting downward movement of the free edge of said blade, means supported from the platform receiving material discharged from the rear edge of the blade and deflecting the same to one side of the right-of-way, said blade at the sides thereof having vertically extending flanges combining with the forward end of the blade to produce a scoop, the means limiting downward movement of the blade comprising links pivoted to said flanges and extending upwardly through the car platform and a stop member associated with the links above the surface of the platform and vertically adjustable thereon.

2. In combination with a wheeled platform the wheels of which are adapted for engagement with the rails of a railroad right-of-way, bearings secured to and supported from said platform, a shaft oscillatable in said bearings, means for oscillating the shaft, a blade carried by the shaft and having its outer edge extending adjacent the inner face of a rail over which the platform is passing, means for limiting downward movement of the free edge of said blade, means supported from the platform receiving material discharged from the rear edge of the blade and deflecting the same to one side of the right-of-way, said means limiting downward movement of the blade comprising links pivoted to the blade and extending upwardly through the platform and means adjustable upon the upper ends of the links for operatively engaging the platform to limit downward movement of the links.

3. In combination with a wheeled platform the wheels of which are adapted for engagement with the rails of a railroad right-of-way, bearings secured to and supported from said platform, a shaft oscillatable in said bearings, means for oscillating the shaft, a blade carried by the shaft and having its outer edge extending adjacent the inner face of a rail over which the platform is passing, means for limiting downward movement of the free edge of said blade and a deflector supported from the platform having a bottom wall the forward edge of which is co-planar with the forward edge of the blade, a rear wall extending upwardly from said bottom wall and arranged at an angle to the longitudinal axis of the wheeled platform, the outer edge of said bottom wall constituting a discharge edge and being arranged outwardly of the rails over which the wheels of the platform are passing, the remaining edges of said bottom wall with the exception of that portion thereof confronting said blade having walls retaining upon the bottom wall material delivered thereto from the blade.

In testimony whereof I hereunto affix my signature.

JOHN T. SOMNIS.